United States Patent Office 3,840,685
Patented Oct. 8, 1974

3,840,685
EMULSIFIED OIL AND SUGAR CEREAL COATING AND PROCESS USING SAME
Angus Alexander Lyall and Robert John Johnston, Niagara Falls, Ontario, Canada, assignors to Nabisco, Inc., New York, N.Y.
Filed May 15, 1972, Ser. No. 253,137
Int. Cl. A23d 5/00; A23l 1/40
U.S. Cl. 426—201
34 Claims

ABSTRACT OF THE DISCLOSURE

A one step process for applying sugar and an edible fat or oil to cereal bases. No separate step of spraying the oil onto the cereal substrate is necessary. The invention also provides an emulsion cereal coating for achieving the above purpose, and a method of preparing said coating. A quantity of edible fats or oils or other edible oil- or fat-derived oleaginous material along with a quantity of emulsifier is added to an aqueous sugar solution to make up a syrup emulsion having a water content in the range of 9%–34% by weight. The edible fat or oil and emulsifier are added to the aqueous syrup at a temperature ranging from 115° F. to 155° F., and after emulsification, the mixture is heated to about 180° F. After enrobing of the cereal particles with this mixture, the coating is then dried.

---

Figure 1:
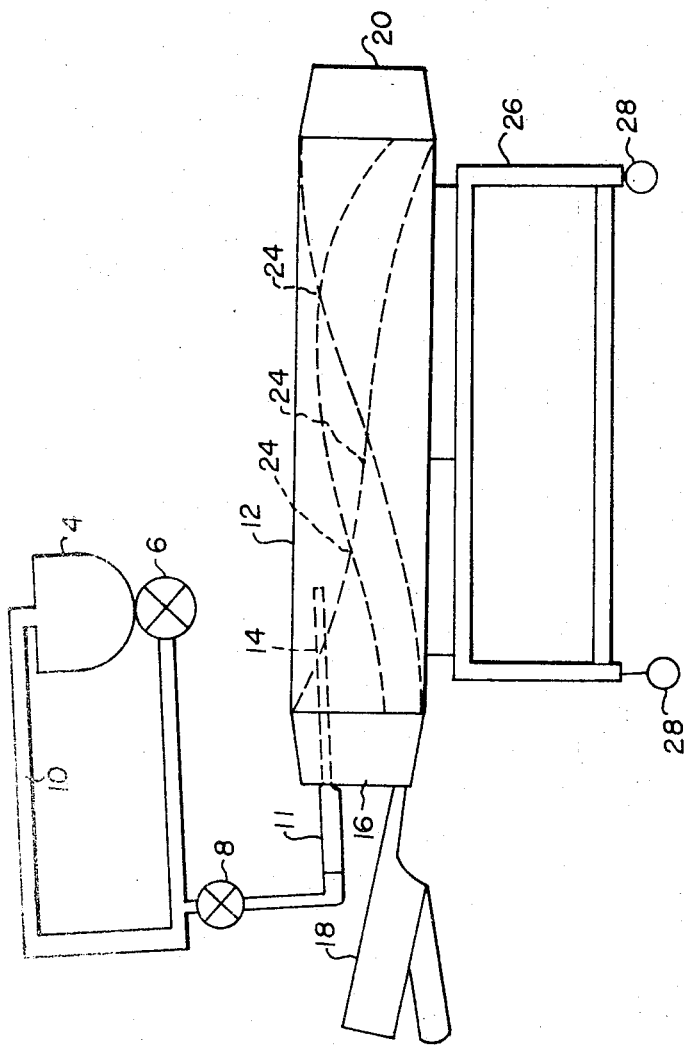

The present invention relates generally to the candy coating of cereal particles. More particularly the invention relates to the application of emulsion coatings containing sugar to cereal particles; and still more particularly, this invention relates to a one-step process for applying sugar and an edible fat or oil to cereal particles, which does away with the necessity of a separate step of spraying or otherwise applying the edible fat or oil onto cereal substrates; and to a process for preparing emulsions containing both sugar and an edible fat or oil for the above purpose.

Processes for the coating or cladding of prepared cereals with sugar or candy coatings to improve their palatability are well known and have been extensively practised for some time. For instance, cereal particles have been enrobed or coated with sugar compositions containing from 2% to 6% moisture which can be liquified by heating and which solidify on cooling into hard transparent coatings; an example of such a process is disclosed in Canadian Pat. No. 528,802 of Massmann et al., wherein the candy coating is heated to a temperature of 320° F.–350° F. under pressure before being sprayed onto the cereal particles. Cereal particles have also been candy coated by tumbling them with a quantity of finely comminuted free flowing sugar while simultaneously heating to a relatively high temperature to convert the powdered sugar to a molten candy which adheres to the surfaces of the particles, as disclosed in U.S. Pat. 3,094,947. A further procedure which has been used is to coat cereal particles with sugar syrups containing about 35% water, and then drying the coated particles, whereupon the coating turns white or assumes a frosted appearance.

Still another process for the candy coating of cereals is that described by Vollink in U.S. Pat. 2,868,647. In that process a syrup containing between 60% and 85% total sugars, including from 1% to 8% by weight, on a dry basis, of non-sucrose sugars such as glucose, invert sugar or the like, is applied to cereal bodies in a suitable manner such as by tumbling or spraying. The coated cereal bodies are then dried to a final moisture content of about 2%–3%. The process provides a hard transparent coating which does not become sticky under humid conditions.

In our pending U.S. Pat. application S.N. 170,510, filed Aug. 10, 1971, entitled "Cereal Coating Composition and Process" there is described another process for the syrup coating of cereal substrates to obtain a hard, transparent glaze coating which is not susceptible to moisture pickup under humid conditions. Briefly this process comprises applying to cereal particles a preheated aqueous syrup solution containing 60–85% by weight of sugar solids, in which the sugar solids are made up of 80%–68% by weight, on a dry basis, of sucrose solids and 20%–32% by weight, on a dry basis, of low dextrose equivalent glucose solids; and then drying the coated particles at a temperature of from about 200° F. to about 260° F., all the while vigorously agitating the coated particles.

The foregoing processes provide hard candy coatings for prepared cereals which improve the palatability of the cereals, and cereals so treated have enjoyed considerable popularity among the consuming public. However there are certain disadvantages and drawbacks attendant with the use of cereals having a glazed candy coating. For instance the texture of such coated cereals is somewhat harsh; and many consumers would prefer cereals which, when eaten, have a somewhat softer, more pleasant feel in the mouth but which, desirably, would still have an appetizing flavor. Another disadvantage is the relatively high degree of brittleness of such coated cereals. A consequence of this is that considerable breakage of such candy coated cereal particles occurs during handling.

Various approaches have been taken in an endeavour to provide sugar coated cereals which would avoid or at least substantially reduce the foregoing disadvantages. It has been found that the coating of prepared cereals with both sugar and an edible oil is one such approach which is fairly effective for this purpose. According to one such process as disclosed in U.S. Pat. 3,582,336 of Rasmusson, prepared cereal particles are clad with an uncooked oil-milk-sugar cladding constituent. Such cladding constituent is applied to the cereal particles in generally fluid condition, at a temperature of from 150°–115° F. It comprises hard butter vegetable fats free of lauric acid in an amount of from 23–35% by weight; 10–20% by weight of nonfat milk solids and 48–60% by weight of sugar or sugar substitute, and, optionally, small amounts of other ingredients such as flavoring agents, salt, anti-oxidants, vitamins and emulsifiers. Only a superficial sheathing or encapsulation of the cereal particles by the cladding agent is achieved, without any substantial impregnation of such particles.

Water-in-oil emulsions which may be used for coating or enrobing various food products are disclosed in U.S. Pat. 3,223,532 of Pinkalla et al. There emulsions comprise: edible fat—4.7%–98.2% by weight; water—1.8%–74.0% by weight; and sugar, 0%–83% by weight. Also included are from 1% to 12%, based on the fat, of a combination of certain specified hydrophilic and lipophilic emulsifiers; and from 1% to 10% by weight, based on the fat, of an edible vegetable or animal wax.

Other processes for coating cereal particles with a mixture of edible oils and sugars are known and are used to some extent. All of the foregoing processes, however, have one or more drawbacks which detract from their acceptability or limit their widespread use. For instance, in some known processes for emulsion coating of cereals, it is necessary to apply the sugar and edible oil to the cereal particles in separate steps, the oil being added first, and then the sugar coating is applied onto the oil-coated particles. This is inconvenient; and moreover, since the sugar is applied in the form of an aqueous syrup, while the oil is water-immiscible, separate apparatus for applying the syrup and the oil to the cereal particles is necessary. This of course, increases the cost of the process. In known processes where cereal particles are coated with a prepared edible oil-sugar admixture, great care must be taken in ensuring that the ingredients of the admixture are within certain specified limits and/or that only certain carefully selected ingredients are used; and/or careful precautions must be taken, or elaborate equipment is necessary in carrying out the coating process. Such precautions render said processes inconvenient to use, or costly, or both.

An objective of the present invention is the provision of prepared, ready-to-eat candy-coated cereals having improved flavor and texture.

Another object of this invention is the provision of prepared, ready-to-eat candy-coated cereals having improved handling characteristics due to decreased frangibility.

A further and important objective of this invention is to provide a one-step process for applying to cereal particles an edible oil and sugar, which does away with the necessity for a separate step of spraying edible oil onto the particles.

Another objective of the invention is to provide a syrup emulsion adapted for applying to cereal particles in accordance with the foregoing process.

The present invention, in one aspect, resides in a cereal coating process which comprises: applying to precooked cereal particles a preheated syrupy emulsion made up of, by weight, 5%–32% of an edible, oil- or fat-derived oleaginous material, preferably an edible vegetable oil such as coconut oil, an aqueous syrup solution containing 60%–85% by weight of sugar solids, and 0.5%–5% of an emulsifier consisting essentially of distilled monoglycerides; and drying the coated cereal particles at an elevated temperature and for a time sufficient to reduce the moisture content of the coated particles to from about 2.0%–3.5% by weight thereof, while vigorously agitating the particles throughout the drying step. The emulsion applied to the cereal particles contains from about 9% to about 34% by weight of water.

Also provided by this invention is a cereal coating composition comprising 5%–32% by weight of an edible, oil- or fat-derived oleaginous materials, preferably an edible vegetable oil; 0.5%–5% by weight of an emulsifier consisting essentially of distilled monoglycerides; and an aqueous syrup solution containing 60%–85% of sugar solids. The composition is in the form of a syrupy, oil-in-water emulsion and has a water content in the range of about 9% to about 34% by weight.

According to a further aspect of the invention, there is provided a process for preparing the foregoing composition, which comprises: admixing together with agitation, the appropriate amounts of water, sugar solids, edible, oil- or fat-derived oleaginous material, and distilled monoglycerides, at a temperature in the range of 110° F.–155° F., and then heating the admixture, with constant agitation, to a temperature of about 180° F. Preferably the aqueous syrup solution is made up first, by mixing together with heating, the appropriate amounts of sugar solids, and water. This solution is then maintained at a temperature of from about 140° F. to 155° F., and to it is added, with constant agitation, the edible oleaginous material and the distilled monoglyceride emulsifier. Upon completion of this step the admixture is heated to a temperature of about 180° F., all the while maintaining constant agitation of the mixture.

The cereal particles which may be coated in accordance with this invention include all ready-to-eat cereal particles in flaked, shredded, expanded, or other forms, such as corn flakes, shredded wheat, puffed wheat, puffed rice, expanded oats, puffed corn, bran flakes, whole bran cereal, breakfast cereals in the form of extruded and puffed doughs, and the like. Such cereal particles are prepared in the usual manner and may be either toasted or untoasted.

In making up the aqueous syrup solutions which constitute one component of the final coating emulsion, any sugar may be used. That is to say, there is no restriction on the type of sugar which may be used. Thus the sugar constituent may be finely granulated sucrose, or finely powdered sucrose such as icing sugar; or it may consist of or include dextrose, invert sugar, corn syrup, molasses, brown sugar, or honey, by way of example. The sugar content of the syrup to be preferred in any given case is governed to some extent by the nature of the cereal particles to be coated.

The edible, oil- or fat-derived oleaginous material used is preferably an edible vegetable oil or fat such as coconut oil, soybean oil, peanut oil, or the like, or semi-solid mixtures containing edible fats or oils, e.g., peanut butter, butter, margarine, unsweetened chocolate, mayonnaise, etc. Other vegetable oils and fats which may be used in the present invention, if desired, are corn oil, cottonseed oil, palm kernel oil, sunflower-seed oil, cocoa butter, babassu oil, olive oil, and the like, or mixtures thereof. Hydrogenated vegetable oils of the above enumerated types are also suitable. Also suitable are such edible animal-derived fats as lard. There are certain factors which are to be considered when deciding upon the type of edible oleaginous material to be used. These factors are the flavor acceptability, aroma and keeping qualities of the final product. For instance, in the manufacture of cereals it is sought to achieve a shelf life of about nine months under average humidity and temperature conditions. Such factors could effectively exclude certain types of such edible oils or fats, or could limit the amount which may be used of certain types of such edible oils or fats; and would exclude such non-vegetable oils as fish or other marine oils of various types.

As previously stated, the emulsifier used in this invention consists essentially of distilled monoglycerides. The monoglycerides employed herein are readily available, edible, fatty materials which chemically are saturated higher fatty acid monoesters of glycerol. The fatty acid moieties of the monoesters broadly comprise 8 to 22 carbon atoms and commonly 14 to 20 carbon atoms. Fatty acid moieties having less than 8 carbon atoms may be involved but the effectiveness of the corresponding monoglycerides is not adequate at practical concentrations. Fatty acid moieties of more than 22 carbon atoms would be satisfactory and could be used. Fatty acids with more than 22 carbon atoms and corresponding glycerides, however, are not available on a commercial scale. Hence, 22 carbon atoms represent a practical upper limit.

The monoglycerides of this invention can be prepared in accordance with well known procedures by direct esterification of saturated fatty acids with glycerine followed by distillation to obtain a high purity monoglycerides mixture. The monoglycerides of this invention can also be prepared by the glycerolysis of saturated vegetable and animal oils, that is, by the interesterification of glycerine with chemically saturated triglycerides, such as those which make up hydrogenated lard, hydrogenated beef tallow, hydrogenated soybean oil, hydrogenated cottonseed oil and similar chemically saturated edible fats and oils. The resulting interesterification reaction mixture is thereafter subjected to thin film, vacuum distillation to distill off a high purity mixture of edible monoglycerides of the chemically saturated type. This preparation of distilled, high purity, monoglyceride compositions is disclosed by Kuhrt in U.S. Pats. Nos. 2,634,234; 3,634,278 and 2,634,279. Such distilled monoglyceride compositions have a concentration of at least 85% by weight monoglycerides and usually contain monoglycerides at a concentration of at least 90% by weight. Moreover, the high purity monoglyceride compositions of commerce are usually solid at room temperature.

A suitable monoglyceride is that known by the trade name "Myverol Type 18–07" (also sold under the trade name "Myvaplex Type 601)." Such product is commercially available and is an edible, chemically saturated monoglyceride composition prepared by interesterification and distillation from glycerine and completely hydrogenated cottonseed oil. This product comprises a mixture of monoglycerides at a concentration of at least 90 weight percent in which the stearic acid and palmitic acid moieties predominate. Thus a small amount of di- and triglycerides in the emulsifier can be tolerated.

Other additives such as vitamins, minerals, coloring agents, flavoring agents and antioxidants may be added to the coating composition of the present invention. The flavoring and coloring agents may be any of those of natural or synthetic origin which are acceptable for food use and are certified for such use by governmental authorities. For instance, the artificial food colors used are FD & C certified food colors or blends thereof. Such artificial food colorants may, if and as desired, be chosen from:

FD & C Red No. 3 (Other names: Food Red 14; Erythrosine BS)
FD & C Yellow No. 5 (Other names: Food Yellow 4; Tartrazine)
FD & C Yellow No. 6 (Other names: Food Yellow 3; Sunset Yellow FCF)
FD & C Green No. 3 (Other names: Food Green 3; Fast Green FCF)
FD & C Blue No. 2 (Other names: Food Blue 1; Indigo Carmine)
FD & C Blue No. 1 (Other names: Food Blue 2; Brilliant Blue FCF)
FD & C Violet No. 1 (Other names: Food Violet 2; Violet 6B).

(FD & C Yellow No. 5 and FD & C Yellow No. 6 are the artificial colorants most commonly used for cereal base products). The flavoring and coloring agents may be added in the amounts necessary to yield the intensity of flavor and color desired. The coloring agent may be carried in edible liquids such as glycerine, propylene glycol and water. Both the flavoring agent and coloring agent may be soluble or dispersible in either the oil phase or the water phase as either the oil or water makes a suitable carrier therefor. The flavoring agent and/or coloring agent may be omitted entirely if desired.

Salt may be added to our syrup emulsions if so desired to improve the flavor. The salt should preferably be a very fine salt, i.e., siftable through a 325 mesh (U.S. Standard) sieve.

In a manner conventional per se our coating compositions may also contain a food anti-oxidant such as BHA (butylated hydroxyanisole) or BHT (butylated hydroxytoluene).

Also as previously stated, various vitamins and minerals in prescribed amount may be added to the compositions of this invention, such as thiamine (Vitamin B1), riboflavin, niacinamide, pyridoxine (Vitamin B6), ascorbic acid (Vitamin C), Vitamin A, Vitamin D, iron, calcium, phosphorus, etc., for example.

As previously mentioned, the coating compositions of this invention contain an edible, oil- or fat-derived oleaginous material in an amount of from about 5% to about 32% by weight of the entire composition. A preferred range for said edible oleaginous material is from about 9% to about 15% by weight of our compositions. A still more preferred range of this constituent is 10%-12% by weight of the composition.

Similarly, while in our invention the monoglyceride emulsifier may be used in an amount in the range of from about 0.5% to about 5% by weight of the total coating composition, (said range being the maximum range of proportions of the emulsifier for use in this invention), we prefer to employ the emulsifier in an amount by weight, of from 0.5% to 2% of the composition. The latter range constitutes the ideal range of proportions of the emulsifier in our composition.

In preparing our coating compositions one can add the appropriate amounts of sugar solids, edible fat or oil, distilled monoglycerides and such other ingredients as colouring and flavoring agents as are desired, simultaneously to water at a temperature of about 140° F. This would effectively drop the temperature of the overall mass to 110°–115° F. The mass is then heated to about 180° F., at which temperature it is ready for application to cereal substrates. We prefer, however, to make up the aqueous syrup solution first, by adding the sugar solids to water at a temperature of 140° F. to 150° F., and effecting dissolution of the sugar with constant agitation and with heating to maintain the temperature within the range of 140°–155° F. Then the edible fat or oil or other edible oleaginous material is added to the syrup solution, while all the while the mass is constantly agitated and heating is maintained. After a short time complete emulsification of the edible fat or oil and water is achieved. Then the mass is heated to a temperature of about 180° F.

It is important that the mass be constantly agitated throughout the stages of adding ingredients and heating to the desired temperature for application to cereals. Any suitable type of agitator or mixer such as propeller or turbine-type mixers may be employed. We have found that a standard "Lightnin' Mixer," (trade name) operating at a speed of 1,725 r.p.m., gives very satisfactory results in making up the cereal coating compositions of this invention.

We have found that consistently successful results in preparing compositions according to the present invention are obtained when the emulsifier is selectively added to the mixture of syrup and edible fat or oil at a temperature in the range of 145°–155° F. It is critical that the emulsifier be added below 156° F.; or stated another way, under no circumstances should the emulsifier be added to a syrup slurry with a temperature reading above 155° F. The final syrup temperatures should desirably be maintained between 170° F.–190° F., and ideally should be between 175°–180° F. Although temperatures of the syrup emulsion preparatory to coating onto cereals may be raised as high as 240° F. without harm to the composition, nevertheless, no advantage with respect to physical characteristics or qualities of the product, is imparted to our formulation by heating it to a temperature in excess of about 180° F.

Heating may be effected by any suitable means. Preferably this is accomplished by the use of steam under pressure, hot water or a heat transfer medium such as "Dowtherm A" (trademark for a eutectic mixture of diphenyl and diphenyl oxide) or "Dowtherm C" (trademark for an isomeric terphenyl mixture).

The following examples are now given to illustrate the preparation of coating compositions according to the present invention.

EXAMPLE 1

| | Weight |
|---|---|
| Water | oz 16 |
| Icing sugar | oz 64 |
| Soyabean oil | oz 7 |
| Distilled monoglycerides | oz 1 |
| Honey | oz 12 |
| Artificial food colour | gm 0.5 |

Preparation of coating:
1. The water, sugar and honey are placed in a hot water jacketed kettle and are heated to 150° F. under constant agitation.
2. The soyabean oil is then added and allowed to melt under agitation.
3. The distilled monoglycerides are added under agitation.

4. Heating is continued, under agitation, to 180° F., then the food colour is added. The coating composition is maintained at this temperature until it is used.

EXAMPLE 2

| | Weight |
|---|---|
| Water ................................................oz__ | 16 |
| Icing sugar ..........................................oz__ | 64 |
| Soyabean oil ........................................oz__ | 4 |
| Distilled monoglycerides ......................oz__ | 4 |
| Honey ..................................................oz__ | 12 |
| Artificial food colour ..........................gm__ | 0.5 |

Preparation of Coating: As per Example 1.

EXAMPLE 3

| | Weight |
|---|---|
| Water ................................................oz__ | 16 |
| Icing sugar ..........................................oz__ | 64 |
| Soyabean oil ........................................oz__ | 19 |
| Distilled monoglycerides ......................oz__ | 1 |
| Honey ..................................................oz__ | 12 |
| Artificial food colour ..........................gm__ | 0.375 |

Preparation of Coating: As per Example 1.

EXAMPLE 4

| | Weight |
|---|---|
| Water ................................................oz__ | 16 |
| Icing sugar ..........................................oz__ | 64 |
| Soyabean oil ........................................oz__ | 10 |
| Distilled monoglycerides ......................oz__ | 1 |
| Honey ..................................................oz__ | 12 |
| Artificial food colour ..........................gm__ | 0.375 |

Preparation of Coating: As per Example 1.

EXAMPLE 5

| | Weight |
|---|---|
| Water ................................................oz__ | 16 |
| Icing sugar ..........................................oz__ | 64 |
| Soyabean oil ........................................oz__ | 15 |
| Distilled monoglycerides ......................oz__ | 1 |
| Honey ..................................................oz__ | 12 |
| Artificial food colour ..........................gm__ | 0.375 |

Preparation of Coating: As per Example 1.

EXAMPLE 6

| | Weight, oz. |
|---|---|
| Water | 16 |
| Icing sugar | 64 |
| Soyabean oil | 36 |
| Distilled monoglycerides | 1 |

Preparation of Coating: As per Example 1.

EXAMPLE 7

| | Weight |
|---|---|
| Water ................................................oz__ | 16 |
| Icing sugar ..........................................oz__ | 64 |
| Soyabean oil ........................................oz__ | 7 |
| Distilled monoglycerides ......................oz__ | 0.5 |
| Honey ..................................................oz__ | 12 |
| Artificial food colour ..........................gm__ | 0.375 |

Preparation of Coating: As per Example 1.

EXAMPLE 8

| | Weight |
|---|---|
| Water ................................................oz__ | 16 |
| Fine granulated sugar ..........................oz__ | 64 |
| Coconut oil ..........................................oz__ | 15 |
| Distilled monoglycerides ......................oz__ | 1 |
| Honey ..................................................oz__ | 12 |
| Artificial food colour ..........................gm__ | 0.375 |

Preparation of Coating: As per Example 1.

EXAMPLE 9

| | Weight |
|---|---|
| Water ................................................oz__ | 16 |
| Fine granulated sugar ..........................oz__ | 64 |
| Coconut oil ..........................................oz__ | 15 |
| Distilled monoglycerides ......................oz__ | 1 |
| Honey ..................................................oz__ | 12 |
| Artificial food colour ..........................gm__ | 0.375 |

Preparation of Coating:

1. All of the above ingredients are placed in a hot water jacketed kettle and are heated to 180° F. under constant agitation.

EXAMPLE 10

| | Weight, oz. |
|---|---|
| Water | 32 |
| Fine granulated sugar | 48 |
| Coconut oil | 15 |
| Distilled monoglycerides | 2 |
| Honey | 12 |

Preparation of Coating: As per Example 1.

EXAMPLE 11

| | Weight, oz. |
|---|---|
| Water | 32 |
| Icing sugar | 48 |
| Coconut oil | 15 |
| Distilled monoglycerides | 2 |
| Honey | 12 |

Preparation of Coating: As per Example 1.

EXAMPLE 12

| | Weight, oz. |
|---|---|
| Water | 32 |
| Old fashioned brown sugar | 48 |
| Coconut oil | 15 |
| Distilled monoglycerides | 2 |
| Honey | 12 |

Preparation of Coating: As per Example 1.

EXAMPLE 13

| | Weight, oz. |
|---|---|
| Water | 16 |
| Icing sugar | 64 |
| Peanut butter | 16 |
| Distilled monoglycerides | 1 |
| Honey | 12 |

Preparation of Coating:

1. The sugar and water are heated to 150° F. under agitation in a hot water jacketed kettle.
2. The peanut butter is then added and allowed to disperse during agitation.
3. The distilled monoglycerides are added at 150° F. while agitation of the mixture is continued.
4. The mixture is then heated to 180° F., under continuous agitation, and when the temperature has reached 180° F. the honey is added.

EXAMPLE 14

| | Weight, oz. |
|---|---|
| Water | 9.1 |
| Fine granulated sugar | 60.0 |
| Soyabean oil | 30.40 |
| Distilled monoglycerides | .50 |

Preparation of Coating: As per Example 1.

EXAMPLE 15

| | Weight, oz. |
|---|---|
| Water | 34.5 |
| Fine granulated sugar | 60.0 |
| Soyabean oil | 5.0 |
| Distilled monoglycerides | 0.5 |

Preparation of Coating: As per Example 1.

EXAMPLE 16

Production Run:                                  Weight
    Water ........................................ lb__ 125
    Icing sugar .................................. lb__ 500
    Coconut oil .................................. lb__ 80
    Distilled monoglycerides ..................... lb__ 7
    Honey ........................................ lb__ 94
    Artificial food colour ....................... gm__ 45

Preparation of Coating:

1. The water is placed in a steam jacketed kettle and is heated to 140° F.
2. The icing sugar and honey are then added, and the mixture is agitated and brought to a temperature of 150° F.
3. The coconut oil is then added while agitation is continued and is allowed to melt.
4. At a temperature of 150° F., the distilled monoglycerides are added to the mixture while agitation of the mixture is continuously carried out.
5. The temperature is then raised to 180° F., all the while continuing agitation, and then the artificial food colour is added. The syrup emulsion so obtained is maintained at the above temperature of about 180° F. until it is used.

Figure 2:
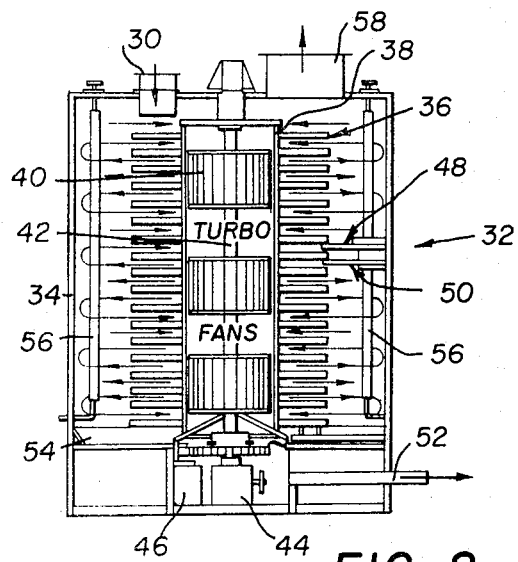

We shall now further describe the invention, in terms of a specific embodiment, and with reference to the drawings which illustrate representative apparatus which may be employed in carrying out the cereal coating process which constitutes one aspect of this invention. In the drawings:

FIG. 1 is a schematic illustration of apparatus used in applying the coating to the cereal particles; and FIG. 2 is an elevation, in section, of the apparatus used for drying the emulsion coated cereal particles.

The first step in the coating operation is the preparation of the syrup. A typical batch size is 806 lbs., consisting of 500 lbs. sugar, 80 lbs. edible fat or oil, 125 lbs. water, 7 lbs. distilled monoglycerides and 94 lbs. honey. The sugar, honey and water are placed in a steam jacketed stainless steel kettle equipped with agitator and heated to 150° F. The edible fat or oil and distilled monoglycerides are added, in that order, to the syrup, all the while maintaining constant agitation and maintaining the temperature at about 150° F. When emulsification is complete the mixture is heated to 180° F., at which point any other additives as desired are added. The syrup emulsion is then pumped through a heat exchanger which is maintained at the temperature at which it is desired to maintain said emulsion, i.e., from 170°–190° F. and preferably at about 180° F. throughout, for a short time. The syrup emulsion is then pumped into a stainless steel steam jacketed holding kettle and held at 180° F. under agitation. Of course, the amounts of ingredients, and to some extent the proportions used as well, need not be those specified above; any desired amounts of sugar, edible fat or oil or other edible oleaginous material, emulsifier and water may be used in making up the syrup solution, as long as the prepared emulsion comprises an aqueous syrup solution containing 60%–85% by weight of sugar solids, 5%–32% by weight of edible fat or oil or other edible oleaginous material, 0.5%–5% distilled monoglycerides and the overall water content of the emulsion is in the range of 9%–34% by weight, based on the total composition. A typical water content of the prepared sugar-oil emulsion is 17%–18% by weight, based on the total composition.

In preparing the syrup in accordance with the present invention, one need not follow in all details the exact order set out in the preceding paragraph, or in the foregoing Examples. For instance, the honey may be added after the syrup emulsion has been formed and the mixture heated to 180° F. instead of during the initial stage of the preparation; that is to say, the honey may be added to the mixture at the same time as the food coloring agent(s) and/or other additives as desired are incorporated thereinto. The honey is in itself a flavoring agent; and in addition, it is a source of a portion of the overall sugar solids content of the aqueous syrup component of the mixture.

The heat exchanger used, which may be referred to as a votator, may be any of a variety of commercial heat exchangers designed for the food industry. One specific type which has been found satisfactory is a Swept Surface Heat Exchanger (Model 2BD–648P) manufactured by Creamery Package, Division of St. Regis, Chicago, Ill. The combination mixer-heat exchanger known under the trade name "Votator" and manufactured by Chemetron Corp. is also satisfactory for the purposes of the present invention.

Referring now to FIG. 1 of the drawing, from the holding kettle 4 the syrup emulsion is pumped by means of a circulating pump 6 through a coating circulating line 10, from the extremity of which a vari-speed pump 8 bleeds off the exact amount per minute to be fed into the coating drum 12, the excess syrup being pumped back to the holding tank. That is to say, a continuous flow of the syrup emulsion is circulated into and out of the holding kettle.

The required coating syrup, at a temperature of about 180° F., is pumped through a horizontal stainless steel intake pipe 14 having seven consecutively drilled holes in the bottom. The number of holes in the intake pipe need not, however, necessarily be limited to seven, but can be varied as desired; it is necessary only that there be a sufficient number of holes in the pipe to ensure an adequate random distribution of syrup onto the incoming cereal particles in the coating drum. Pipe 14, which is connected to the end of syrup line 11, protrudes wholly into the upper portion of the coating drum intake 16. The cereal pieces are fed simultaneously into the bottom portion of the coating drum 12 by means of a vibratory feeder 18. The syrup solution is deposited gravitationally onto the cereal pieces.

A suitable vibratory feeder for supplying the cereal partices to the coating drum is that known as the "Syntron" feeder. ("Syntron is a trade name.) This is a well known type of feeder, and consists of a feeding chute caused to vibrate by means of the oscillating armature of an electromagnetic device anchored to the main frame. A rheostat or equivalent device is provided for adjusting the current input, thereby controlling the pull of the electromagnet and thus the length of strokes; in this way the capacity of the feeder, or, stated another way, the flow of material, is adjusted to any given volume and/or weight per minute.

Although in a preferred embodiment of the invention the intake pipe or feed line 14 through which the syrup is fed into drum 12 is provided with seven consecutively drilled holes in the bottom, it will be understood that the number of holes or orifices in this pipe may be varied. It is necessary, however, that several such holes or orifices be provided in order to ensure a proper distribution of syrup onto the incoming cereal particles in the drum.

As aforesaid, the coating syrup drops gravitationally through a plurality of consecutively placed orifices in the syrup feed line onto the flow of cereal. This method effects a random or percentage coating of the cereal inflow. Complete coating coverage of the cereal pieces achieved with the rotation of drum 12 and the cereal pieces therewithin, so that syrup on overcoated pieces of cereal is transmitted to undercoated pieces before the cereal reaches the discharge end 20 of the drum. No heat is applied during the coating process.

The rotating coating drum 12 (FIG. 1) is approximately 10 feet long by 2 feet in diameter and is provided with three (3) spiral flights 24 secured to the inner surface of the drum wall and extending longitudinally of said drum, the flights having a pitch of approximately 30° towards the discharge end (shown in dashed lines in FIG. 1). The flights carry the coated product around the inside periphery of the drum while the pitch carries the product towards the discharge end 20 of the drum, both actions enabling the transmission of syrup from one cereal piece to another so that an even distribution of coating is achieved. A suitable coating drum for use in carrying out the process of the present invention is the Manley Coater (Model 2070) manufactured by Manley, Inc., Kansas City, Mo.; however, it is to be understood that other coating apparatus may also be used.

The coating drum may be permanently installed in one position or (as shown in FIG. 1) may be movable, in which event drum 12 is mounted on a suitable platform 26 equipped with means for rollably moving the assembly, such as wheel or casters 28.

The discharged wet-coated product is carried by a conveyor belt equipped with an automatic belt washer (not shown), to the top side intake 30 (see FIG. 2), of a vertical turbo dryer.

To effect drying of the coated cereal particles, we subject the particles to a temperature of 180°–225° F. for a period of from about 28 to about 40 minutes, and at the same time subject the coated product to a great deal of agitation throughout the drying stage. Any dryer which can provide for substantial agitation of the contents during the drying stage can be used; however, we have found that one dryer which is particularly effective for the purposes of the present invention is a vertical turbo dryer, illustrated in FIG. 2, such as that known as the "Wyssmont Model SR-20 Dryer" (trademark). The ideal retention time for the drying step, we have found, is 35 minutes, and the ideal drying temperature is about 200° F. as tabulated below.

| Temp. range | Min. | Max. | Ideal at 28 lbs./min. input |
| --- | --- | --- | --- |
| Manifold (° F.) | 400 | 550 | 450 |
| Drying zone (° F.) | 180 | 225 | 200 |
| Retention time (min.) | 28 | 40 | 35 |

This is sufficient to achieve drying of the coated cereal particles to a final moisture content in the range of 2.0%–3.5% by weight.

Referring now to FIG. 2 of the drawings, the "Wyssmont Model SR-20" dryer is a vertical cylindrical gas-fired turbo dryer, designated by the numeral 32 in FIG. 2. Within the cylindrical housing 34 is mounted a set of segmented trays or shelves 36, each of which resembles a doughnut shaped pie plate with each tray section resembling a pie wedge. These trays are superimposed in a framework, which we shall refer to as the tray rotor 38 that revolves slowly within housing 34. Tray rotor 38 consists of an array of about twenty of the annular trays 36 in the center of which a plurality of turbo fans 40 revolve to circulate air over the trays. Turbo fans 40 are mounted on a central shaft 42 which is driven by a suitable prime mover 44. Tray rotor 38 is driven by a second, separate prime mover 46. The wet material (in this case syrup coated cereal particles) enters dryer 30 at the top through intake 30 and falls onto the top shelf or tray as it rotates beneath the feed opening. After one revolution (approximately 1½ minutes) the material is pushed or wiped by a stationary wiper 48 through radial slots (not shown) to the tray below. Material fed to the top tray (and to each succeeding tray) is leveled by a suitable leveling device 50. The action is repeated on each tray as the material progresses downwardly through the dryer until the dry material is discharged from the bottom tray via conduit 52 onto a conveyor (not shown) whence it is passed to packaging or to storage.

As shown in FIG. 2, a stream of preheated air e.g., manifold heated air (450° F.) enters dryer 32 via duct 54 at the base of the dryer, and circulates through the dryer following a tortuous path as shown by the arrows X. The air passes across each tray 36 radially and into contact with internal gas-fired heaters 56 arranged within the dryer adjacent the periphery of housing 34; and is recirculated. After circulating through the dryer, the air, laden with moisture extracted from the material on the trays with which it has been in contact, is exhausted through duct 58 at the top of the dryer. As to the rate at which the heated air is circulated through the dryer, this may be varied to some extent, depending upon the temperatures maintained in the dryer, the type of dryer used, the length of drying time, the moisture content of the syrup coating on the cereal particles, etc., as will be apparent to those skilled in the art. We have found that a satisfactory rate of circulation of the preheated air into a "Wyssmont Model SR-20" turbo dryer is 2290 c.f.m.

It is important in the present invention, that after coating of the cereal particles is completed, the coated product be subjected at least initially, to a substantial amount of heat in order to attain complete separation of the cereal particles during the drying stage. By a "substantial amount of heat," in this context, we mean a temperature of at least 180° F. and preferably at least 200° F. Since exposure of candy coated cereal particles to elevated temperatures for prolonged periods of time can result in damage to the product, such as by causing carmelizing of the coating, it is necessary that such exposure to elevated temperatures during drying be as short as possible, consistent with the requirement for drying of the syrup to a candy coating with a low moisture content (about 2–3%). This is achieved by carrying out the drying in a vertical turbo dryer as described above. The circulation of heated air over the revolving trays causes some agitation, but most of the agitation of the cereal particles is effected by the twenty consecutive drops through radial slots from one tray to the next, as the coated cereal passes from the top to the bottom of the dryer.

The temperature at which the drying is carried out ranges, as aforesaid, from about 180° F. to about 225° F., with the upper portion of the dryer being maintained, desirability, at a temperature within the range of 200° F. to 225° F. and the lower portion of the dryer being maintained at a temperature of from about 180° F. to about 220° F. The drying time is from about 28 to about 40 minutes, and preferably is approximately 35 minutes, based on a dryer output of 1680 lb./hour of dry coated cereal particles having a final moisture content of 2%.

Although our invention has been described in detail with reference to a particular embodiment, it will be apparent to those skilled in the art that variations and modifications in processing conditions and/or equipment, or in materials employed in making up the coating composition, are possible. For instance, the coating of cereal particles may be effected by spraying the emulsion syrup onto said particles using any suitable apparatus, rather than by the "random drip method" particularly described herein. It is to be understood, then, that the present invention is not to be limited to what has been particularly described herein: our intention is that the invention cover all embodiments as may fall within the ambit of the claims which follow.

We claim:

1. A cereal coating process which comprises, in sequence, the steps of
    (a) applying to prepared cereal particles a syrupy oil-in-water emulsion having a temperature in the range of from about 170° F. to about 240° F., said emulsion comprising by weight, based on the total weight of said emulsion, 5%–32% of an edible oil- or fat-derived oleaginous material, an aqueous syrup solution containing 60–85% by weight of sugar solids, and 0.5%–5% of an emulsifier consisting essentially of distilled monoglycerides, said emulsion containing, by weight, from about 9% to about 34% of water; no heating being carried out during the application of said emulsion to said cereal particles; and (b) drying the coated cereal particles at a temperature and for a time sufficient to reduce the moisture content of said coated cereal particles to a level in the range of 2.0% to 3.0% by weight of said particles, while vigorously agitating the particles throughout the drying step, thereby obtaining discrete, candy-coated cereal particles.

2. A process as set forth in claim 1 in which the emulsion contains 9% to 15% by weight of said oleaginous material, based on the total weight of said emulsion.

3. A process as set forth in claim 1, wherein the emulsion contains 0.5%–2% by weight of distilled monoglycerides, based on the total weight of said emulsion.

4. A process as set forth in claim 1, in which the syrup component of said emulsion comprises approximately 80% by weight of sugar solids.

5. A process as set forth in claim 1, in which the emulsion is applied to said cereal particles at a temperature within the range of 170° F.–190° F.

6. A process as set forth in claim 1, wherein the drying step is effected at a temperature in the range of 180° F.–225° F. and for a time of about 28 to about 40 minutes.

7. A process as recited in claim 6, wherein the drying step is effected at a temperature of about 200° F. and for a time of about 35 minutes.

8. A process as set forth in claim 1 wherein said edible oleaginous material is peanut butter.

9. A process as set forth in claim 1 wherein said edible oleaginous material is an edible vegetable oil.

10. A process as set forth in claim 1, wherein the coating of the cereal particles is effected by spraying.

11. A process as set forth in claim 1, wherein the coating of the cereal particles is effected in a rotating coating drum, said emulsion and said cereal particles being fed simultaneously into said drum.

12. A process as recited in claim 11, wherein said emulsion being fed into the drum is allowed to fall by means of gravity onto the incoming cereal particles.

13. The process of claim 12, wherein the emulsion is pumped into the upper portion of the coating drum through a horizontally disposed feed pipe projecting thereinto, said feed pipe having in the bottom thereof a plurality of consecutively placed orifices; and the cereal particles are fed into the lower portion of said coating drum; said syrupy emulsion falling by means of gravity through said orifices onto said cereal particles as the latter move forwardly through the drum.

14. The process of claim 13 wherein the coated cereal particles are rotatably conveyed through the drum from the intake end thereof toward its discharge end, by means of spiral flights secured to the inner surface of the wall of said drum and extending longitudinally thereof, whereby said syrupy emulsion is transmitted from one cereal particle to another as the cereal particles pass through said drum, thereby to achieve an even distribution of the coating on said cereal particles.

15. A process as set forth in claim 1, in which the drying step is carried out in a vertical turbo dryer.

16. A cereal coating composition consisting essentially of 5%–32% of an edible, oil-or-fat-derived oleaginous material, an aqueous syrup solution containing 60%–85% by weight of sugar solids, and 0.5%–5% of an emulsifier consisting essentially of distilled monoglycerides, said percentages of ingredients being by weight based on the total weight of the composition; said composition being in the form of a syrupy oil-in-water emulsion having a water content in the range of about 9% to about 34% by weight, whereby said composition when preheated to a temperature in the range of about 170° F. to about 240° F., can be applied by direct application to cereal particles without further heating during said application.

17. The composition of claim 16 wherein the aqueous syrup solution contains approximately 80% by weight of sugar solids.

18. A composition as set forth in claim 16, said composition containing 9%–15% by weight of said edible oleaginous material.

19. A composition as set forth in claim 16, said composition containing 0.5%–2% by weight of distilled monoglycerides.

20. A composition as set forth in claim 16 wherein the edible oleaginous material is peanut butter.

21. A composition as set forth in claim 16, in which the edible oleaginous material is an edible vegetable oil.

22. A composition as set forth in claim 21, in which the edible vegetable oil is selected from the group consisting of soybean oil and coconut oil.

23. A composition as set forth in claim 16, in which the aqueous syrup solution is formed by dissolving in water a sugar selected from the group consisting of fine granulated sucrose, icing sugar, and brown sugar.

24. A composition as defined in claim 23, in which the aqueous syrup solution also includes honey.

25. A process for preparing a cereal coating composition in the form of a syrupy oil-in-water emulsion and comprising 5%–32% by weight of an edible, oil- or fat-derived oleaginous material, an aqueous syrup solution containing 60%–85% by weight thereof of sugar solids, and 0.5%–5% of an emulsifier consisting essentially of distilled monoglycerides, and having a water content in the range of about 9%–34% by weight of said composition; which process comprises: admixing together with agitation the appropriate amounts of water, sugar solids, edible oil or fat-derived oleaginous material, and distilled monoglycerides, at a temperature in the range of 110° F.–155° F.; and heating the admixture, with constant agitation, to a temperature of about 180° F.

26. A process as in claim 25, comprising: forming said aqueous syrup solution by mixing together with heating, the appropriate amounts of sugar solids and water;

maintaining said solution at a temperature in the range of 140° F.–155° F. and adding thereto with constant agitation said edible, oil- or fat-derived oleaginous material and said distilled monoglycerides; and heating the admixture, with constant agitation, to a temperature of about 180° F.

27. A process as in claim 25 wherein said edible oleaginous material is an edible vegetable oil.

28. A process as in claim 25 wherein said edible oleaginous material is peanut butter.

29. A process as in claim 26 wherein honey is added to the admixture when the latter is at a temperature of about 180° F.

30. A process as in claim 26 wherein the aqueous syrup solution is brought to and maintained at a temperature of about 150° F., and an edible vegetable oil and the distilled monoglycerides are added to said solution at said temperature of about 150° F.

31. A process as in claim 30 wherein addition of the edible vegetable oil is made before that of the distilled monoglycerides, both additions being made at said temperature of about 150° F.

32. A process as in claim 30, wherein said edible vegetable oil is selected from the group consisting of coconut oil and soybean oil.

33. A process for preparing a cereal coating composition in accordance with claim 25, wherein the appropriate amounts of said sugar solids, edible oil- or fat-derived oleaginous material and emulsifier are added simultaneously to said water at a temperature of about 140° F., and the entire admixture is heated, while constantly agitating same, to a temperature of about 180° F.

34. A process in accordance with claim 25, wherein the admixture, after being heated to a temperature of about 180° F., is maintained at said temperature until used.

References Cited
UNITED STATES PATENTS

| | | | |
|---|---|---|---|
| 3,582,336 | 6/1971 | Rasmusson | 99—83 |
| 3,223,532 | 12/1965 | Pankalla et al. | 99—123 |
| 3,094,947 | 6/1963 | Green et al. | 99—83 |
| 3,318,206 | 5/1967 | Fast | 99—83 |

RAYMOND N. JONES, Primary Examiner

U.S. Cl. X.R.

426—93, 99, 103, 209, 305, 307, 363